Nov. 30, 1937.  W. S. BRINK  2,100,626
SPACER
Filed Dec. 24, 1934

INVENTOR
Winfield S. Brink
BY
ATTORNEY

Patented Nov. 30, 1937

2,100,626

UNITED STATES PATENT OFFICE 2,100,626

SPACER

Winfield S. Brink, Akron, Ohio, assignor to The Firestone Steel Products Company, Akron, Ohio, a corporation of Ohio Application December 24, 1934, Serial No. 758,964

5 Claims. (Cl. 301—13)

This invention relates to spacers, and more especially it relates to annular spacers such as commonly are used upon the felloes of vehicle wheels for effecting proper lateral spacing or separation of a pair of rims for pneumatic tires mounted thereon.

Spacer rings of the character mentioned as heretofore constructed were of channel shape, the lateral thrust of the tire rims being taken by the lateral flanges of the channel, whereby especially rugged construction was required to prevent deformation of the flanges.

The chief objects of this invention are to provide an improved spacing ring for the purpose mentioned, which ring will be lighter in weight than those heretofore provided, without sacrifice of strength; and to provide spacer rings at reduced cost. Other objects will be manifest.

Figure 1:
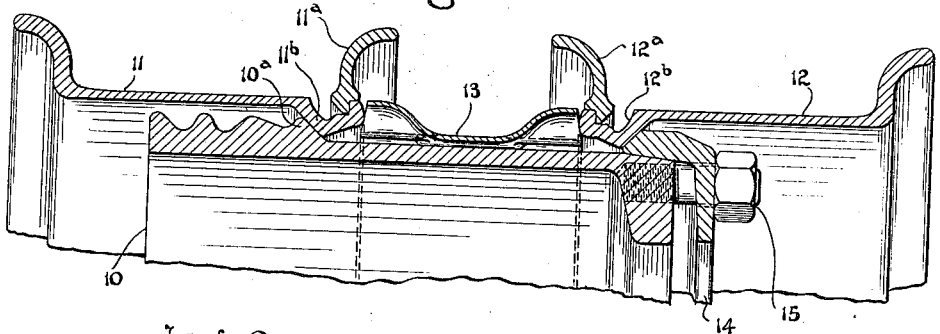
Figure 1 is a fragmentary transverse section through a wheel felloe and dual tire rims, and one embodiment of the improved spacer operatively positioned between said tire rims.

Referring to the drawing, 10 is the felloe of a vehicle wheel and 11, 12 are respective inner and outer tire rims mounted thereon for the reception of pneumatic tires (not shown). The said tire rims are of the type that comprises a removable, endless, tire-retaining ring 11a, 12a respectively at one margin thereof, said retaining rings being seated in suitable circumferential grooves or gutters formed on the margins of the respective rim structures by inwardly offset portions 11b, 12b of the latter. The rims 11, 12 are mounted upon the felloe 10 with their offset portions 11b, 12b disposed adjacent each other in abutting relation with a spacer ring 13 positioned between said rims. The tire rims and spacer are maintained in assembled relation on the felloe by means of a circumferential rib 10a formed on the latter against which the offset 11b of rim 11 abuts with a wedging action, and a split clamping ring 14 that is secured to the outer lateral margin of the felloe by a plurality of bolts 15, said clamping ring being angular in section and having a portion that extends laterally into wedging engagement with the offset portion 12b of rim 12.

Figure 2:
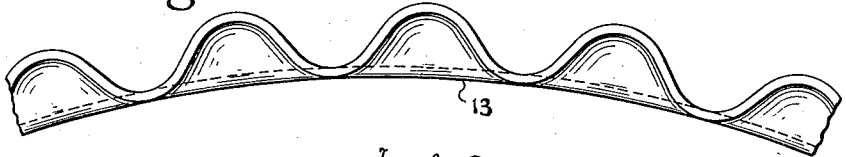
Figure 2 is an edge view of the spacer.
Figure 3:
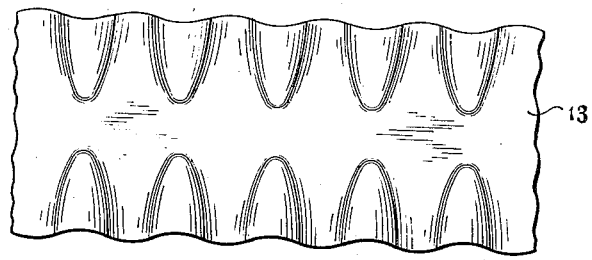
Figure 3 is a fragmentary developed plan view of the spacer shown in Figure 1.

The spacer ring 13 consists of an endless metal band of suitable inside diameter to fit easily over the felloe 10 and of suitable width to hold the rims 11, 12 the proper distance apart. The opposite marginal portions of the spacer ring are deformed or corrugated outwardly from the inside diameter of the ring into undulations which are substantially in the form of a circumferential succession of sinusoid curves at the lateral margins of the ring, as is most clearly shown in Figure 2. The outwardly struck deformations of the ring taper and slope laterally of the ring and merge with the undeformed medial region thereof at each side of the latter. As is most clearly shown in Figure 3, the undulations on one margin of the spacer ring are aligned with those on the opposite margin thereof.

When the spacer ring 13 is on a felloe between a pair of tire rims 11, 12, the adjacent margins of the latter, consisting of the inwardly offset portions 11b, 12b, abut the respective undulated lateral portions of the spacer ring, usually about midway of their innermost and outermost extremities. Thus the laterally directed pressure of the rims is applied to the margins of the spacer ring, at spaced points thereof, the shape of the undulations producing a buttress effect which provides sufficient rigidity so that the ring resists the pressure of the rims without flexing or otherwise deforming.

The spacer ring may be made of relatively light gauge metal as compared to spacers heretofore provided, experience having shown that a spacer made according to this invention and weighing but four pounds may be successfully used in situations where a channel-shaped spacer weighing 11 pounds heretofore has been required. If desired, the spacer may be provided with the usual inwardly extending lug or lugs (not shown) for locking engagement with certain types of felloes.

Figure 4:
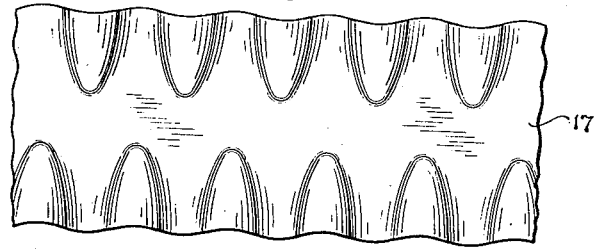
Figure 4 is a view similar to Figure 3 of another embodiment of the invention.

The embodiment of the invention shown in Figure 4 and designated 17, is similar to that shown in the other figures of the drawing except that the undulations on one of its margins are offset or staggered with relation to those on its other margin.

Other modification may be resorted to without departing from the spirit of the invention or the scope of the appended claims.

What is claimed is:

1. A spacer for use on a wheel felloe between dual tire rims thereon, said spacer consisting of a metal band having its marginal portions deformed radially outwardly and laterally directed so that its lateral edges abut the respective tire rims outwardly of the medial region of the band and receive the lateral thrust of said rims.

2. A spacer for use on a wheel felloe between dual tire rims thereon, said spacer consisting of a metal band having corrugated marginal portions, said corrugations sloping and tapering toward the medial region of the band and gradually merging therewith at each side of said medial region.

3. A spacer for use on a wheel felloe between dual tire rims thereon, said spacer consisting of a metal band having corrugated marginal portions and a non-corrugated medial region, said corrugations being disposed entirely radially outwardly of said medial region.

4. A spacer for use on a wheel felloe between dual tire rims thereon, said spacer consisting of a metal band having corrugated marginal portions, and a non-corrugated medial portion therebetween, said corrugations being in alignment transversely of the band.

5. A spacer for use on a wheel felloe between dual tire rims thereon, said spacer consisting of an annular metal band having corrugated marginal portions, and a non-corrugated medial portion therebetween, the corrugations on one margin being in offset or staggered relation to the corrugations on the other margin.

WINFIELD S. BRINK.